US006310691B2

(12) United States Patent
Cariffe

(10) Patent No.: US 6,310,691 B2
(45) Date of Patent: *Oct. 30, 2001

(54) TECHNIQUE FOR SCANNING DOCUMENTS USING A SPIRAL PATH LOCUS

(75) Inventor: Alan E. Cariffe, San Diego, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,622

(22) Filed: Apr. 24, 1998

(51) Int. Cl.$^7$ .............................. G06F 15/00; H04N 1/04
(52) U.S. Cl. ........................ 358/1.1; 358/1.12; 358/474
(58) Field of Search .................................. 358/474, 478, 358/484, 486, 488, 489, 493, 496, 497, 491, 494, 1.1, 1.12

(56) References Cited

U.S. PATENT DOCUMENTS

| | | | |
|---|---|---|---|
| 2,389,408 | 11/1945 | Boyd | 179/180 |
| 3,962,721 | * 6/1976 | De Hann | 358/4 |
| 4,069,484 | * 1/1978 | Firestrer et al. | 346/33 F |
| 4,276,561 | * 6/1981 | Friedman | 358/78 |
| 4,410,968 | * 10/1983 | Frohbach et al. | 369/44 |
| 4,609,818 | 9/1986 | Lennemann et al. | 250/234 |
| 5,317,337 | 5/1994 | Ewaldt | 346/1.1 |
| 5,589,952 | * 12/1996 | Sato | 358/487 |
| 5,935,331 | 8/1999 | Naka et al. | 118/319 |

FOREIGN PATENT DOCUMENTS

| | | | |
|---|---|---|---|
| 34 44 089 | 9/1985 | (DE) | B41L/19/00 |
| 0 337 812 | 10/1989 | (EP) | G03B/27/47 |
| 1406482A | 9/1975 | (GB) | B41J/25/28 |
| 64-23137 | * 1/1989 | (JP) | G01J/1/00 |
| 01 090433 | 4/1989 | (JP) | H04N/1/04 |
| 04043925A | * 2/1992 | (JP) | H04N/5/33 |
| 09 265860 | 10/1997 | (JP) | G11B/23/38 |

OTHER PUBLICATIONS

European Search Report dated Apr. 20, 2000 for related European patent application 89303073.3, filed Apr. 21, 1999.
Wills, L.J., Jet Printer With Rotatable Jet Head, Research Disclosure, No. 228, Apr. 1983, p. 22817, XP002109052, Havant Hampsire, Great Britain.

* cited by examiner

Primary Examiner—Jerome Grant, II

(57) ABSTRACT

An optical scanning technique employs an optical sensor array for collecting image pixel data from a flat medium during a scanning cycle. A motion apparatus provides relative motion between the sensor array and the medium such that a spiral locus is defined by the sensor array relative to the media during a scanning cycle. The spiral maximum diameter may be made equal to the diagonal dimension of a rectangular media, thus allowing pixel data to be collected very close to the edge of the media, and so reducing or eliminating the area of unscannable margins on both sides and the top and bottom of the media. The motion apparatus can include a turntable for rotating the flat medium about a center of coordinates, and a translatable carriage holding the sensor array. An ink jet printhead can be mounted on the motion apparatus, to provide a multi-function scanner/printer machine.

29 Claims, 8 Drawing Sheets

TECHNIQUE FOR SCANNING DOCUMENTS USING A SPIRAL PATH LOCUS

CROSS-REFERENCE TO RELATED APPLICATION

This application is related to co-pending application Ser. No. 09/066,621, entitled "Inkjet Printing Techniques Using Spiral Retative Motion Between the Print Medium and Print Elements." The entire contents of which are incorporated herein by this reference.

TECHNICAL FIELD OF THE INVENTION

This invention relates to optical scanning techniques, and more particularly to a new method for continuous unidirectional scanning which reduces mechanical hysteresis and reduces the area of unscanned media to zero by scanning along a spiral locus path. This method produces data which exactly matches the data requirements of a spiral path locus ink-jet printer.

BACKGROUND OF THE INVENTION

Conventional optical scanners employ linear array optical sensors, and an apparatus for providing relative motion between the document or image to be scanned and the linear array sensor. In a general sense, the image is scanned by producing a series of scans of a given swath width, which are then assembled or processed by a processor in a rectilinear, Cartesian sense to provide the scanned data representing the image or document.

This invention improves upon the typical, rectilinear Cartesian document scan in such a way as to produce sampled information from printed, drawn or photographic media which exactly matches a method of ink-jet printing along a spiral path locus. This invention also provides a way to capture the information present on the media all the way to the edges of the scanned media the same as in flat-bed scanners, and results in a simpler mechanical structure for the scanner.

In the referenced co-pending application Ser. No. 09/066, 621, entitled "Inkjet Printing Techniques Using Spiral Relative Motion Between the Print Medium and Printing Elements," a method is describer which improves upon an ink-jet printing hysteresis problem, and an ink-jet printing margin problem. In this co-pending application, it is shown that, by printing in a uni-directional manner along a spiral path, both of these printing problems are reduced or eliminated. However, because document scanners typically scan information from text or photographic media in a raster or x-y Cartesian fashion, there then necessitates a re-sampling or conversion from rectangular coordinates to polar coordinates to effect the printing of the scanned data on a spiral path. It is realized that this conversion process could produce undesirable printing artifacts under some circumstances, and the purpose of this invention is to eliminate these artifacts entirely. Also, in many non-flatbed scanners, mechanical constraints do not allow the scanning sensors to view documents all the way to the document edges; hence information may be lost during a conventional non-flatbed scanning process. This invention also can result in a simplification of the mechanism required to move and house the scanner, since the scanning array may be mounted either in place of, or radially co-linear with, an ink-jet printing nozzle array, thus providing a printer and a scanner, both of which share electrical and mechanical parts to a large extent.

SUMMARY OF THE INVENTION

A method for optically scanning a flat image is provided in accordance with one aspect of the invention. The method includes a sequence of the following steps;

providing an optical sensor array;

supporting a flat medium to be optically scanned by the sensor array during a scanning cycle;

providing relative motion between the sensor array and the medium such that a spiral locus is defined by the sensor array relative to the media during an optical scanning cycle; and collecting sensor data representing the image during the optical scanning cycle.

In a preferred embodiment, the step of providing relative motion is accomplished without causing the sensor array to stop and reverse its direction periodically during the scanning cycle.

In a further aspect of the invention, an optical scanning system comprises an optical sensor array comprising a plurality of sensor elements for collecting image data during an optical scanning cycle. A flat medium is positioned relative to the sensor array to permit optical sensing of an image carried by the flat medium during an optical scanning cycle. A relative motion apparatus provides relative motion between the sensor array and the medium such that a spiral locus is defined by the sensor array relative to the media during an optical scanning cycle.

The scanning system can further include, in a multi-function system, an ink jet pen having a nozzle array, and apparatus for providing relative motion between the nozzle array and the medium such that a spiral locus is defined by the nozzle array relative to a flat print medium during an ink jet printing cycle.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

In accordance with an aspect of the invention, a technique of optical scanning involves providing relative motion between a flat medium bearing the image to be scanned and an array of light sensors along a spiral path, which preferably is the exact spiral path to be subsequently used in an ink-jet printing process. This scanning technique eliminates the need for any coordinate conversions whatsoever, and eliminates any printing artifacts introduced by such conversions or resampling when used with a printer designed for such data. Alternatively, the data produced may be easily re-sampled into commonly used rectangular coordinates using known techniques, such as a convolution technique.

Additionally, the spiral maximum diameter may be made equal to the diagonal dimension of a rectangular media, thus allowing information very close to or at the edges of the media to be captured, and so reducing the area of non-scanned margins to zero on both sides and the top and bottom of the media when it is subsequently rendered. Benefits resulting from uni-directional scanning and non start-stop motions of the scanning array will also reduce effects of mechanical hysteresis present in some scanning mechanisms.

What is desired is to provide relative motion between a light sensor array and a flat media, without actually causing the light sensor array or media to stop and reverse direction periodically, and, according to a further aspect of the invention, to cause the information so scanned to match, in a one-to-one correspondence, that information subsequently required by an ink-jet rendering process. A spiral pattern of pixels so scanned in accordance with this aspect of this invention provides image data pixels located at physical media coordinates which may be exactly rendered or printed by a spiral printer whose nozzle arrays correspond in physical location to those of the array of light sensors comprising the light sensor array. This results from the characteristic of sensor arrays that pixels are sampled at some sample rate, and the sampling rate can be chosen in dependence on the firing rate of the ink jet printer nozzles.

The spiral pattern can be accomplished, in one exemplary embodiment, by mounting the scanner array on an arm which radiates from a center of coordinates in RHO ($\rho$), THETA ($\theta$) coordinate space, where RHO is a measure of distance from a center of coordinates, and THETA is a measure of angle, most usually in radians. The scanner array can then be moved outward from this center, while at the same time the media may be rotated in a circle around the center of coordinates. Alternatively, the sensor array can be rotated and translated instead of the media to provide a spiral locus for the sensor elements relative to the print medium.

Figure 1:
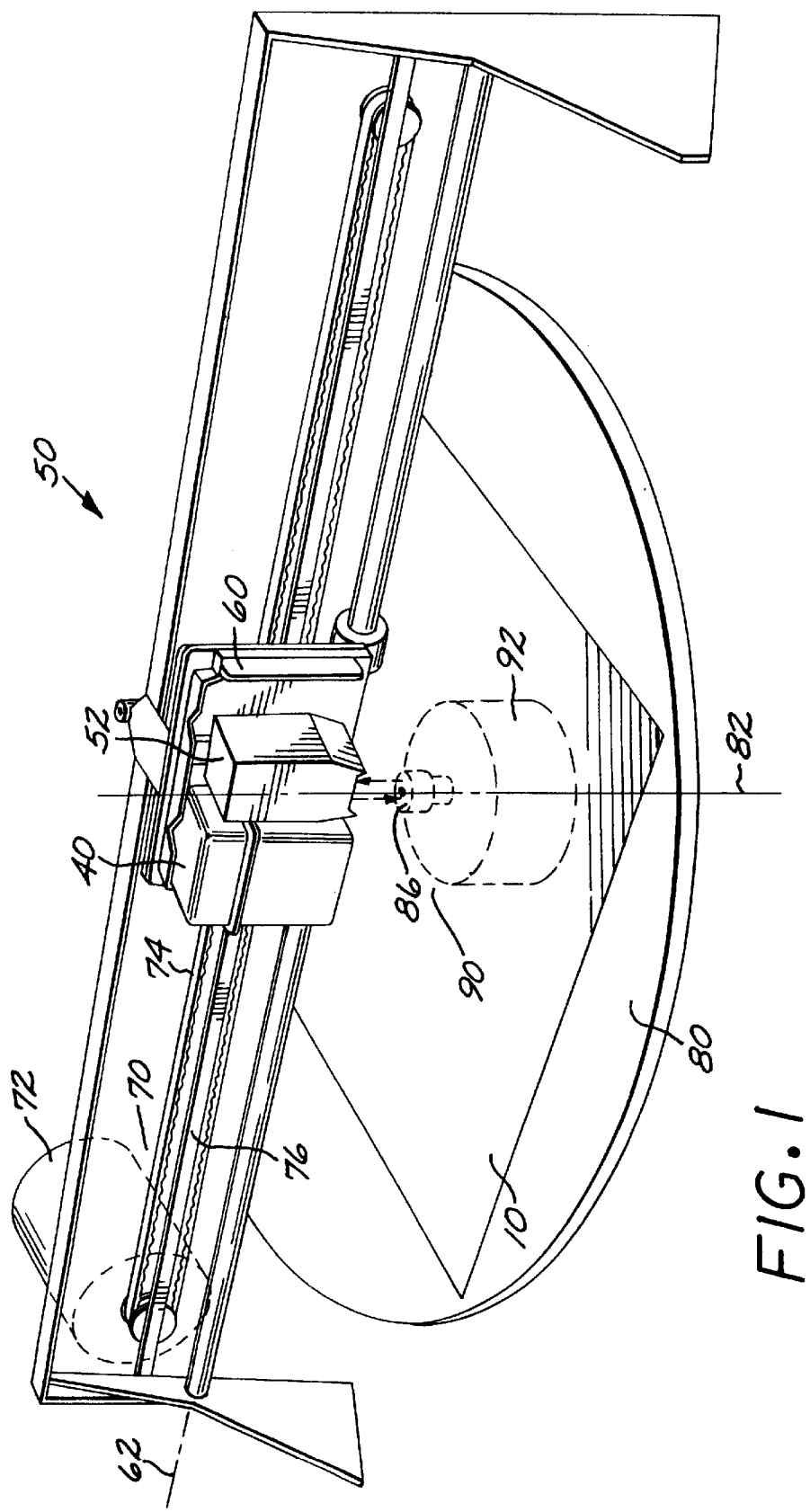
FIG. 1 is a diagrammatic isometric view of an exemplary embodiment of an optical scanning system embodying the present invention.
Figure 2:
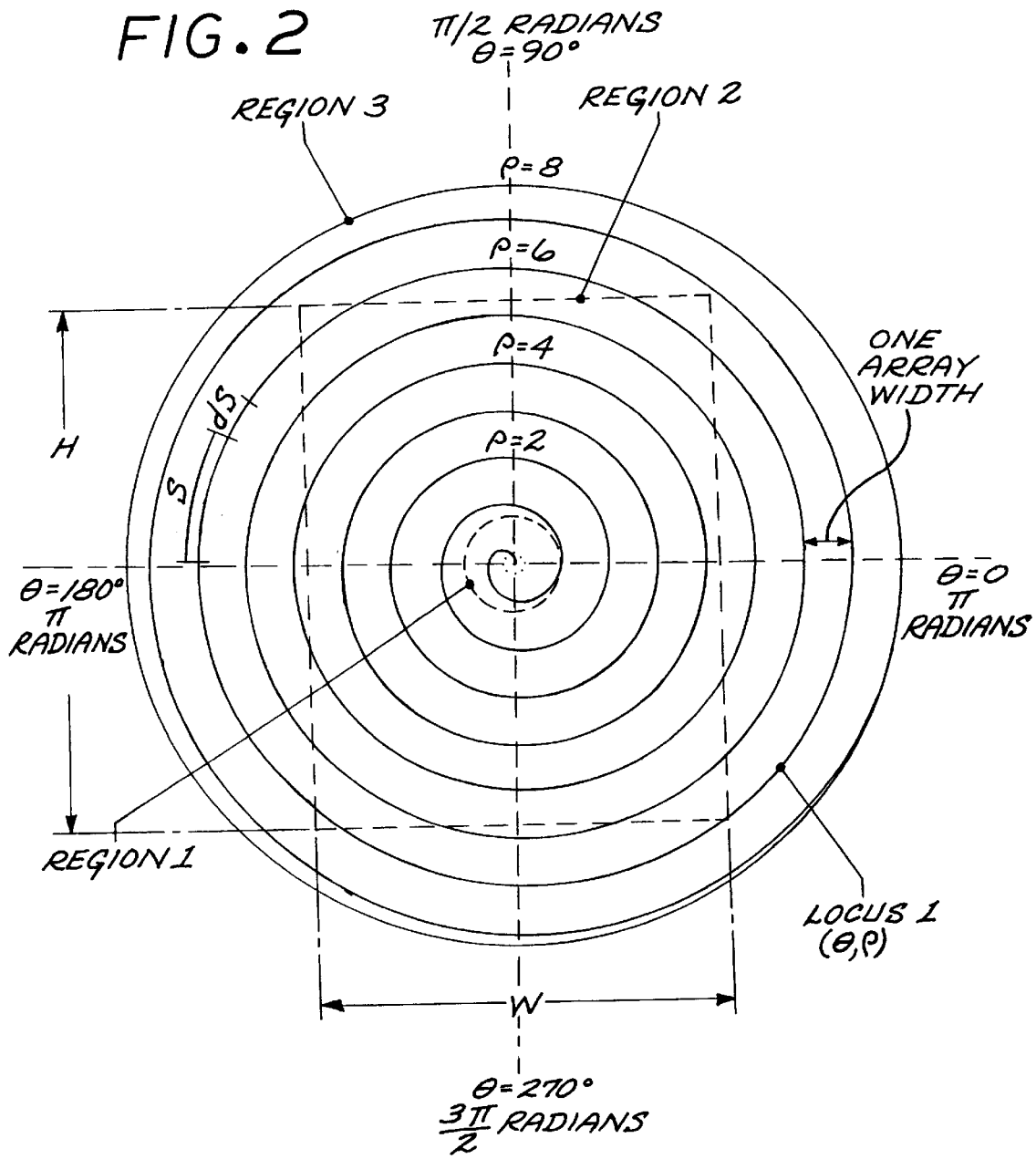
FIG. 2 is a graphical illustration of the spiral locus path of the relative motion between the optical sensor array and the flat medium, in accordance with an aspect of the invention.
Figure 3:
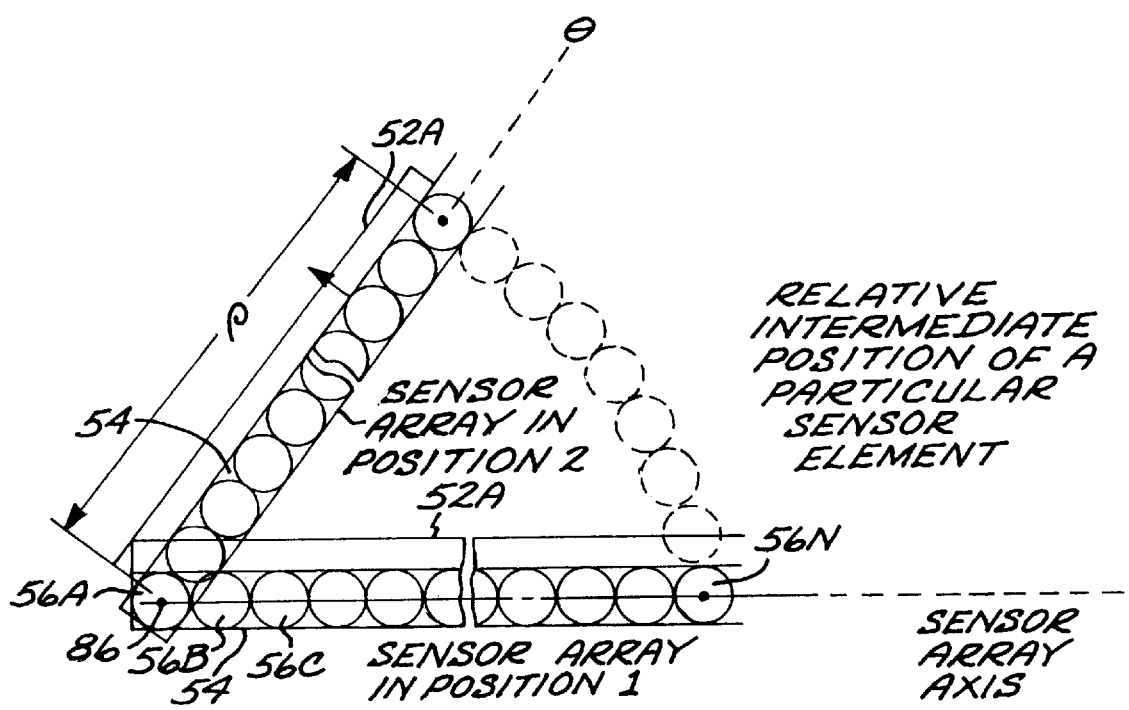
FIG. 3 illustrates a simplified sensor array with a plurality of sensor elements for the sensor head of the scanning system of FIG. 1, in two positions relative to the surface of the flat medium.

FIGS. 1–8 illustrate an optical scanning system 50 which embodies this invention. An optical sensor head 52 is supported in a carriage 60. The sensor head includes a sensor array 54 comprising sensor elements 56A–56N, and an illumination source 52A (FIG. 3). An exemplary optical scanning head suitable for the purpose is described in pending application Ser. No. 08/717,921, entitled UNDERPULSED SCANNER WITH VARIABLE SCAN SPEED, P.W.M. COLOR BALANCE SCAN MODES AND COLUMN REVERSAL, by Haselby et al., filed Sep. 23, 1996, the entire contents of which are incorporated herein by this reference. The carriage 60 is adapted for movement along a scan axis 62. A carriage drive system 70 is coupled to the carriage to drive the carriage in a path along the axis 62. The exemplary carriage drive system 70 includes a drive motor 72, belt drive 74, and encoder strip 76 with encoder sensor 78 (FIG. 4) for providing carriage position data. Other drive mechanisms can alternatively be employed, such as lead-screw drives.

The medium 10 bearing the image to be scanned, e.g. a sheet of a document, a drawing, or a photograph, is supported on a flat turntable platen 80 which is in turn mounted for rotation about a center axis 82, which at the plane of medium 10 defines the center of coordinates 86. The turntable platen 80 is driven by a rotary turntable drive system 90 which includes a turntable motor 92 and a turntable encoder 94 (FIG. 8) for providing turntable position data.

In an exemplary embodiment, an apparatus is provided for holding the medium 10 flat against the turntable platen 80. Such apparatus are well known in the art, e.g. a vacuum hold-down system, an electrostatic system, or a mechanical system with a fixture for holding the medium in place.

The carriage axis 62 intersects the linear sensor array axis above the center of coordinates 86 (FIG. 3).

Also shown in FIG. 1 is a second device 40 held by the carriage. This device can be an ink jet pen, so that the machine 50 is a multi-function machine capable of both optical scanning functions and ink jet printing function, e.g. as a copy machine for first scanning a document and then printing a copy. Motions of the carriage and the media turntable may be used to allow both devices to sweep over the same regions on the medium. The second device 40 is optional, and can be omitted for some applications requiring only an optical scanning function.

FIG. 2 is a chart illustrating the relative motion path, a spiral locus, of the sensor array in relation to the medium 10 during a scanning operation in accordance with an aspect of the invention. LOCUS 1 is a trace of the path taken by the light sensor element of sensor array 54 which is mounted furthest from the center of coordinates 86, relative to the surface of the medium 10. REGION 1 is the circular region defined by the light sensor sweep which would occur with a stationary light sensor, when the center of the innermost light sensor is coincident vertically with the center of coordinates, such that the inner light sensor element is over the center of coordinates 86, and the light sensor element located at the position of LOCUS 1 is the furthest from this center. REGION 2 illustrates a rectangular scanning region, of dimensions W by H, of an exemplary rectangular image or document. REGION 3 is bounded by a circle indicating the outer limit of coverage for the spiral scanning process.

FIG. 3 illustrates a simplified linear sensor array 54 with a plurality of sensor elements 56A–56N and a linear illumination source 52A. The sensor array can provide monochromatic or color image data; both types of sensor heads are well known in the art. The illumination source can be an array of LEDs, and can include for full color applications red, blue and green LEDs. Typically, as is well known in the art, the illumination source is controlled by a controller to provide light flashes timed in accordance with the sampling of the sensor elements; however other illumination schemes may also be used. Position 1 shows the sensor array in a start position relative to the surface of the medium 10, with the sensor element 56A at the platen center of coordinates 86. Position 2 shows a relative rotation (by some angle θ) between the sensor array 54 and the medium 10. In this exemplary embodiment, the carriage is stationary during the first complete rotation of the platen 80, to provide complete coverage, i.e. to sweep out, REGION 1. This first complete relative rotation is circular, and the sensor element 56A remains at the center of coordinates 86, which is illustrated in FIG. 3. On the second rotation, the carriage is put in motion, to provide a relative path as shown in FIG. 4.

FIG. 2 also illustrates the condition that the radial motion of the light sensor array is constrained to linearly move one unit of distance for each $2\pi$ radians (360 degrees) rotation of the media, where one unit of distance is equal to the maximum radial 'span' of the light sensor array. Thus, in FIG. 2, the spiral sweep does not overlap or underlap onto itself. For the third and all subsequent rotations of the platen 80, there will be no overlapped coverage of the sensor array relative to earlier rotations/passes of the sensor array.

In order to completely sample REGION 1 with potential light sensor events, when the light sensor array is located over REGION 1, it needs to maintain this position during one full revolution of the media, in order to completely scan this central region. Subsequently, as the light sensor array moves outward, all the remaining area of REGION 3 becomes the potential target of light sensor events, an event being the sampling of the light emanating from a particular RHO, THETA position on the media, that is, a sample of one pixel which is to subsequently be rendered by an ink-jet mechanism, as more particularly described in the co-pending application referenced above. REGION 3 is circular, but most of the common media which it is desired to scan and sample digitally is rectangular, as indicated by REGION 2. In order to completely cover this rectangular region, the innermost light sensor element of the light sensor array needs to travel from the center of coordinates outward, and the outermost sensor element must be able to just reach the furthest corners of the media.

Figure 4:
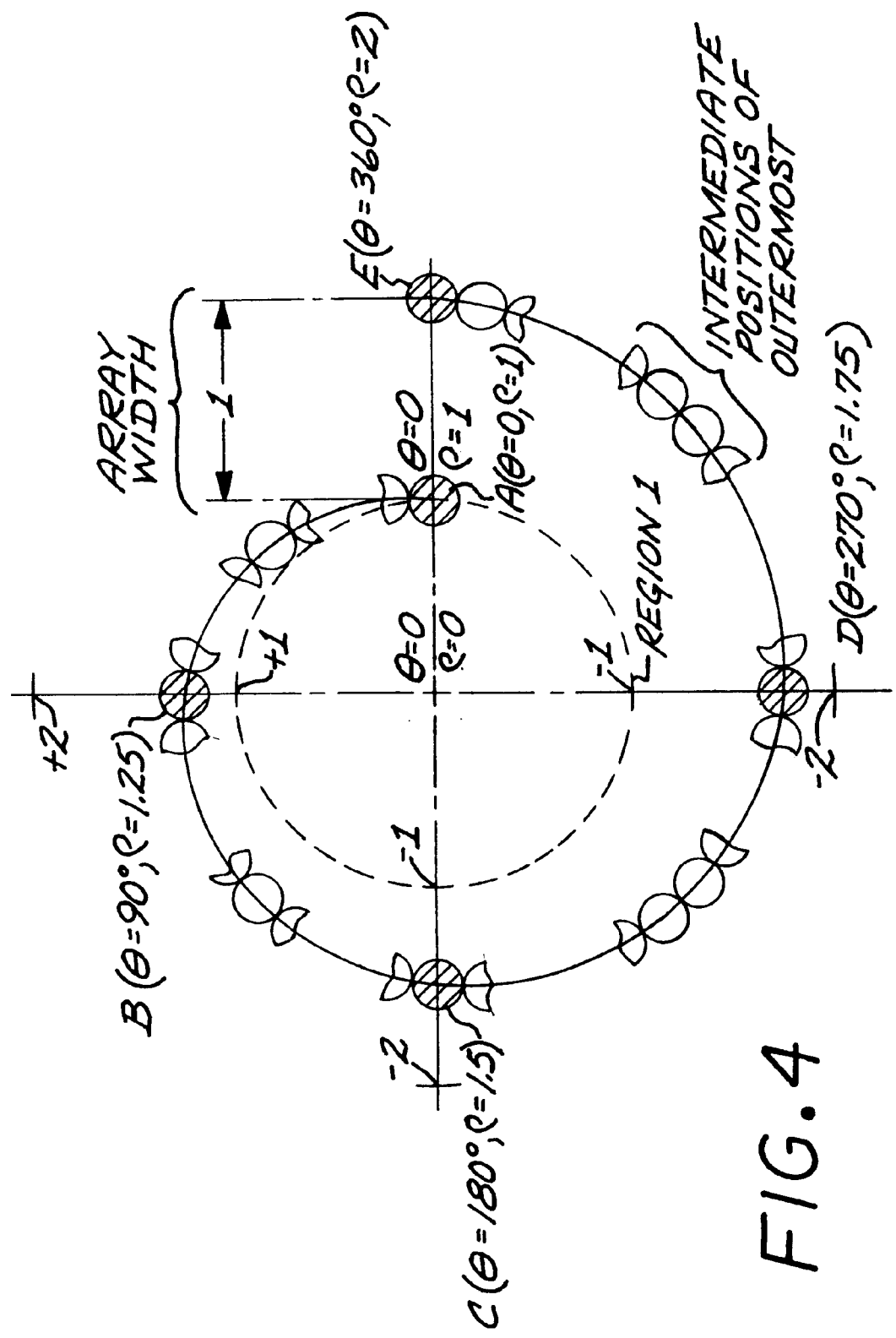
FIG. 4 is a simplified illustration of one exemplary path of the outermost sensor of the sensor array of FIG. 3 for a complete rotation ($2\pi$ radians) of the medium, for the case of a non-overlapped sensor array spiral.

FIG. 4 is a simplified illustration of the path of the outermost sensor element 56N for a second complete rotation ($2\pi$ radians) of the medium 10, i.e. for the case of a given motion of the carriage along the carriage axis 62 as the platen 80 rotates. The path starts at position A of the sensor element 56N, at $\theta=0$, radius $\rho=1$ unit (equal to the width of the sensor array), and ends at position E of the sensor element 56N, at $\theta=2\pi$, $\rho=2$ units. The sensor element 56N follows through the path illustrated relative to the medium, with position B occurring at $\theta=\pi/2$, $\rho=1.25$ unit, position C occurring at $\theta=\pi$, $\rho=1.5$ unit, and position D occurring at $\theta=3\pi/2$, $\rho=1.75$ units. During this second complete rotation, i.e. the first rotation after the carriage is put into motion, there will be overlapped coverage of sensor elements with respect to the initial rotation within REGION 1. Preferably, the printer controller is programmed to suppress collecting data from the overlapped sensor elements, for this second rotation, over the overlapped area to prevent duplicate pixel coverage. Also, the sensed pixel elements are preferably spaced evenly along the spiral path in accordance with standard design practices.

Figure 5:
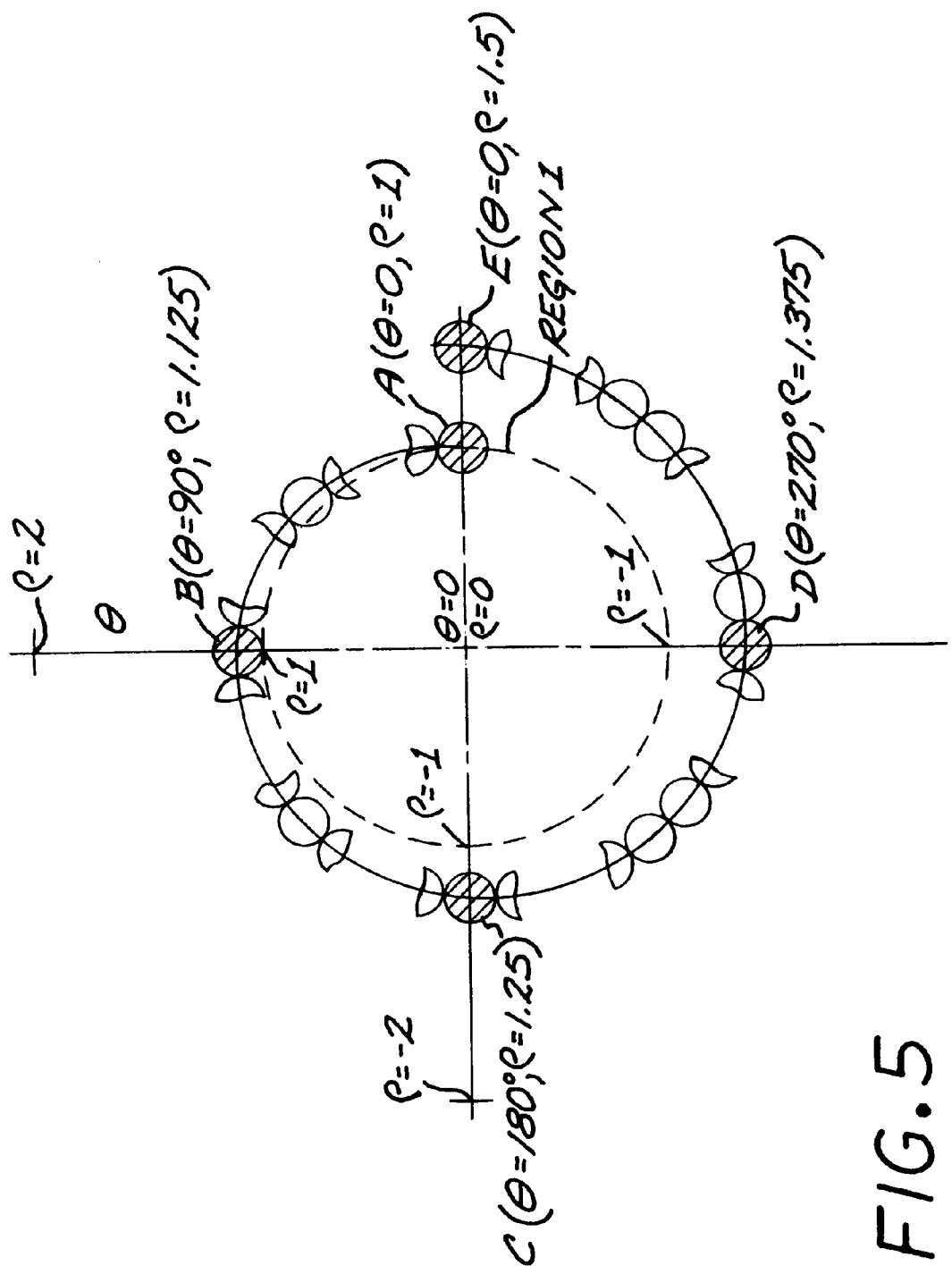
FIG. 5 is a simplified illustration of a first alternate path of the outermost sensor element of the sensor array of FIG. 3 for a complete rotation ($2\pi$ radians) of the medium, for the case of a partially-overlapped sensor array spiral.
Figure 6:
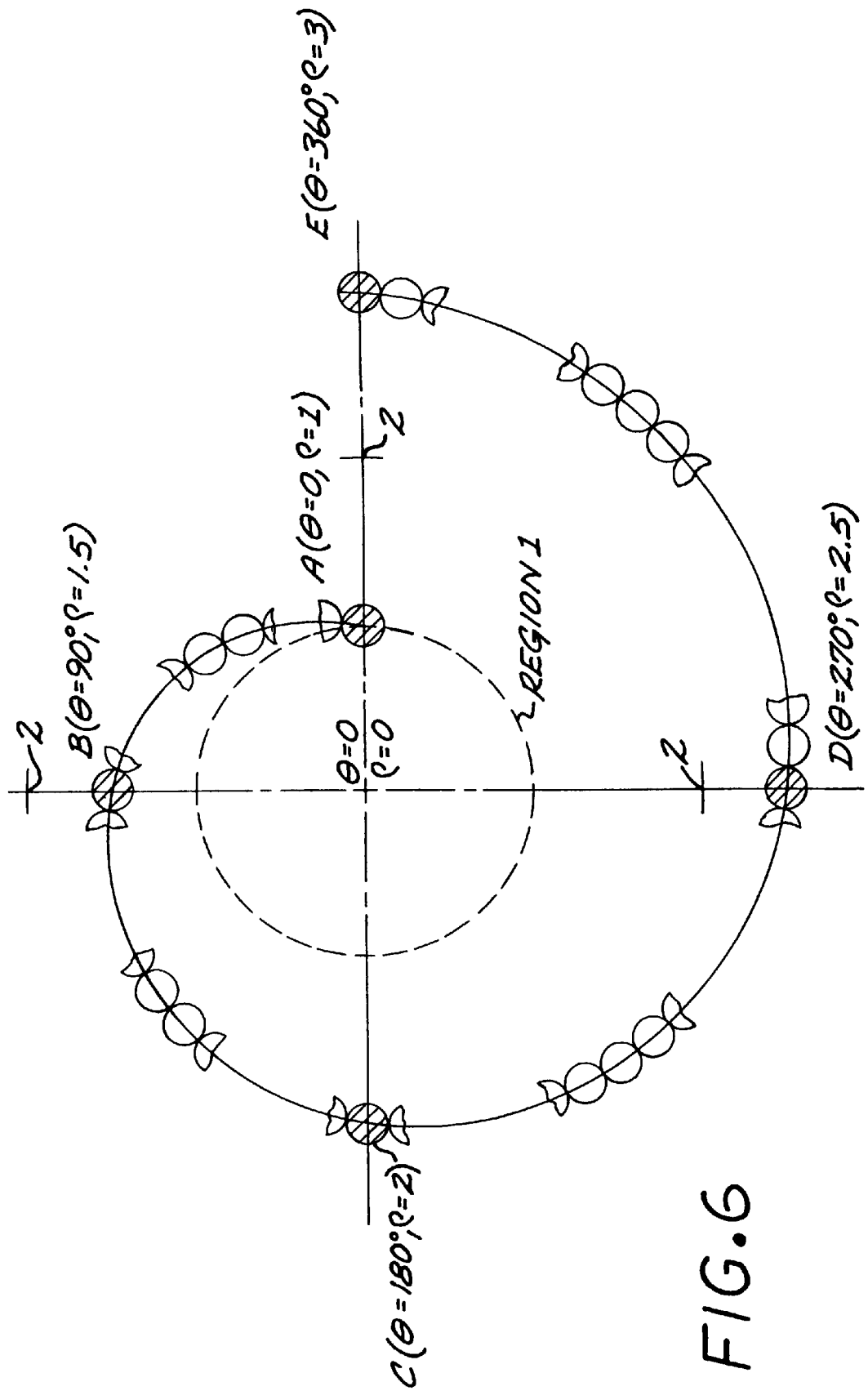
FIG. 6 is a simplified illustration of a second alternate path of the outermost sensor element of the sensor array of FIG. 3 for a complete rotation ($2\pi$ radians) of the medium, for the case of a partially-underlapped sensor array spiral.

In many applications it may be desirable to overlap the path to prevent spiral banding, just as is presently done to prevent swath banding in known rectangular coordinate scanners by averaging several samples at the same pixel ($\rho,\theta$) coordinate. In this case, then, the sensor array will be moved less than a full sensor array width (1 unit) for each $2\pi$ radians rotation of the medium 10. FIG. 5 illustrates an exemplary spiral locus for such an overlapped case. In this example, the carriage moves outwardly at a rate of 0.5 unit (sensor array width) per complete rotation of the sensor array. Alternatively, the sensor array can be moved more than a full sensor array width for each $2\pi$ radian rotation of the medium 10, providing gaps in the sensor coverage as the sensor array moves outwardly. These gaps can be filled in on a reverse spiral scan, moving the sensor array from an outside position back to the start position shown in FIG. 3. FIG. 6 illustrates an exemplary spiral locus for such an underlapped case. In this example, the carriage moves outwardly at a rate of 2 units (sensor array widths) per complete rotation of the sensor array.

Figure 7:
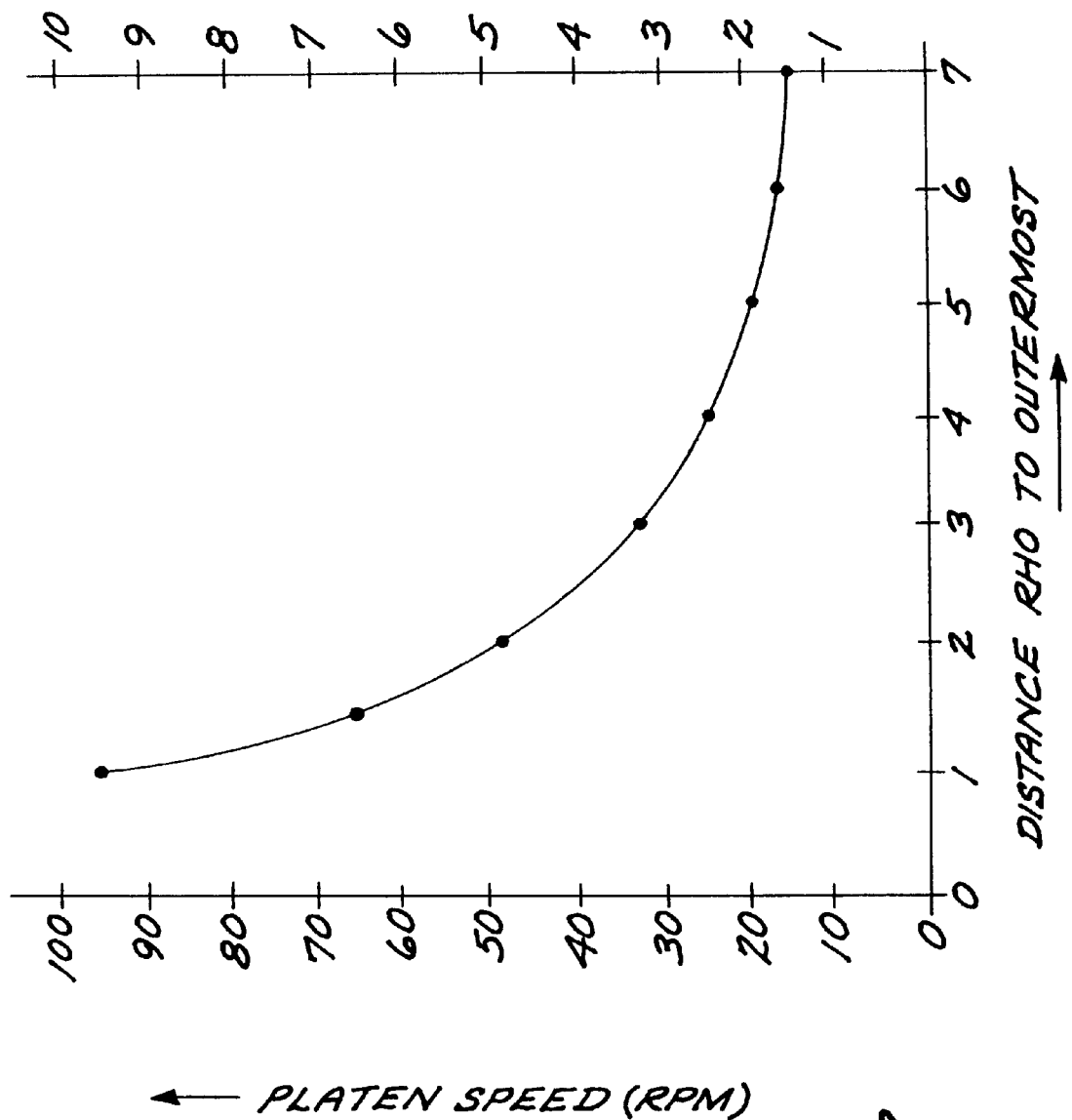
FIG. 7 is a graph of the angular speed of the flat medium as a function of radial distance for the embodiment of FIG. 2.

In many scanning cases, the light sensor elements sample pixels at a constant rate such that pixels are sampled at uniformly equal distances one from another along an axis, although it is not required by this invention. However, if this is a desired operation, then since the relative velocity of a given sensor element along the spiral will increase with radius RHO for a constant rotational speed, the circular rotational velocity of platen 80 can be adjusted such that if S is a tangential distance along LOCUS 1, and [1] dS=RHO*dTHETA using 'd' to indicate "differential" as in calculus notation, then if t stands for time, [2] dS/dt=RHO*dTHETA/dt=V, where V is the desired constant velocity along LOCUS 1. Solving [3] dTHETA/dt=V/RHO, where RHO starts out as one unit sensor array width, and reaches $(W^2+H^2)^{1/2}/2$ at the point where full coverage of the media has occurred. Because RHO is a variable which occurs in the denominator position, this means the rotational velocity is a nonlinear function of the position of the light sensor array, if a constant tangential velocity of the array is desired. FIG. 7 is a graph plotting the angular speed of the head as a function of the radial distance from the center of coordinates. Put another way, the maximum rotational rate of the media will be V radians per second, when the innermost light sensor element is located over the center of rotation, and the minimum rotational velocity will be $2V/(W^2+H^2)^{1/2}$ radians per second for a light sensor array of 1 unit length, or span.

By way of illustrative example, assume that it is desired to sample, or scan, edge-to-edge on an 8.5×11 inch media using a light sensor array which consists of 300 light sensors elements, each of which is spaced equally from its neighbors by 1/300th of an inch. This array then is 1.0 inches long. Suppose further that the maximum tangential velocity that this head supports, while sampling pixels at its maximum rate, is 10.0 inches per second. Thus, 10*300=3000 light samples are taken per second while the array moves over the media at this speed, and the "swath-width" is 1.0 inch wide.

The maximum position the light sensor element furthest from the center of rotation needs to be away from this center, for this example, is $(W^2+H^2)^{1/2}/2=(8.5^2+11^2)^{1/2}/2=6.95$ inches. When this light sensor element reaches this outer limit of RHO its rotational velocity will be dTHETA/dt=V/RHO=10.0 inches per-second/6.95 inches=1.44 radians per second, or about 13.75 RPM (rotations per minute) as in FIG. 7. The tangential velocity is the rotational velocity times the radius, which is 1.44*6.95=10 inches per second, as expected. Now when the light sensor element furthest from the center of rotation is at RHO=1.0 inch, the rotational velocity is 10.0 inches-per-second/1.0 inches=10.0 radian-per-second, or about 95.5 RPM as in FIG. 7.

The total scan time can be approximated as the time it takes to sweep out the total circular area of REGION 3 at the constant rate of 10 square inches per second (the area swept out be the head in one second is the length of the light sensor array times the distance traveled in one second). The "swept out" circular area is $\pi(RADIUS)^2=3.14159*(6.95)^2=151.75$ square inches. At 10 square inches per second, this is about 15.2 seconds.

Figure 8:
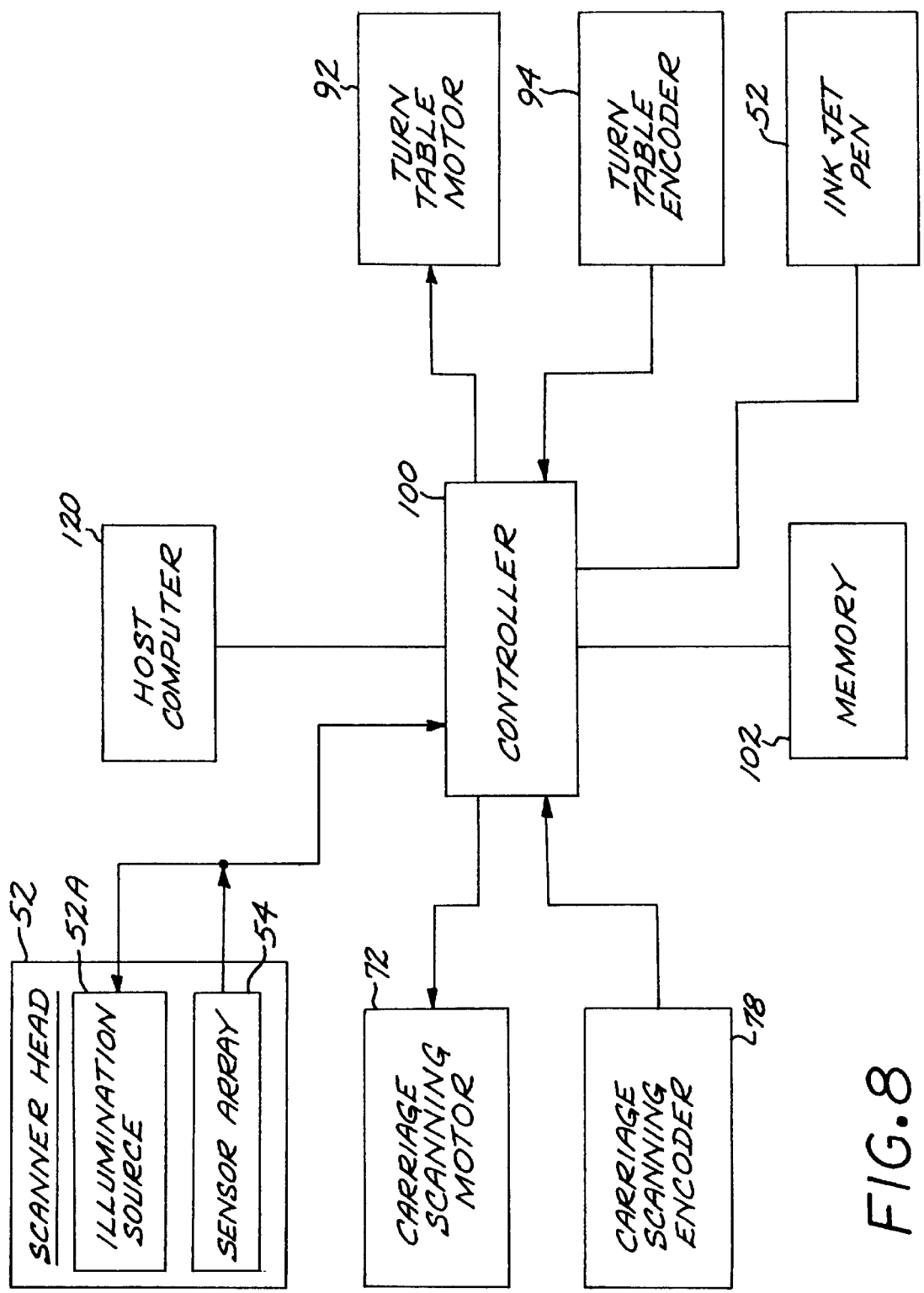
FIG. 8 is a simplified schematic block diagram of the control system comprising the optical scanner system of FIG. 1.

FIG. 8 is a simplified schematic block diagram of the control system for the system illustrated in FIG. 1. A controller 100 is coupled to a memory 102 for storage of image data collected during a scan job. The controller generates the drive commands to the carriage scanning motor 72, which comprises the carriage drive, and receives position signals indicative of the carriage/sensor array position from carriage scanning encoder 78. The controller also generates turntable motor drive commands to control the turntable motor 92 which rotates the turntable platen, and receives encoder signals from the turntable encoder 94 to determine the position and angular velocity of the turntable platen. The controller thus can control the carriage drive to achieve a non-overlapping spiral locus of the sensor array with respect to the medium, or an overlapped spiral locus to prevent banding or other artifacts, or an underlapped locus to provide for other special scanning modes. Other exemplary scanning modes include skipping scanning (collecting data) on alternate rotations forming the spiral, and to reverse the direction of the carriage at the end, filling in the omitted pixel data in the alternate rotations.

The controller also receives sensor data from the optical sensor array, and, in the event the system 50 includes a printing function, provides firing pulses to the pen 40 in dependence on the image to be generated and the position of the pen in relation to the center of coordinates. The image data can be stored in the memory 102, or transmitted to or received from a host computer 120.

The controller also provides sampling control signals to the sensor elements 56A–56N of the array 54, and illumination source control signals to the illumination source 52A, in dependence on the scanning mode and the position of the sensor head 52 in relation to the center of coordinates. The image pixel data collected during the scanning process can be stored in the memory 102, or passed to a host computer 120. The controller can also set the sampling rates for the various sensor elements. While in many cases it is desirable to use a constant (maximum) sampling rate, for other jobs or applications, the controller can control the sampling rate to be non-constant over a particular scan job, or to use a slower constant sampling rate. Faster or slower sampling rates can be used to achieve higher or lower densities of pixel data in particular regions on the medium 10.

Each sensor element in the sensor array 54 is at a different radial distance from the center of coordinates 86 than any other sensor element. The result of this is that sampling all sensor elements at a constant rate produces pixel spacing differences which will be readily apparent at small values of RHO, especially in REGION 1 of FIG. 2. For example, in REGION 1 during the initial rotation of the media (which is not accompanied by a radial motion of the carriage), and for a $1/300^{th}$ inch sensor element spacing, the sensor element 56N (FIG. 3) at RHO furthest from the center of rotation must sample 300 times for every inch along the circumference. For a one inch sensor array, the circumference is $2\pi$ inches. Hence there will be 1,885 pixels sampled at a spacing of $1/300^{th}$ of an inch along this circumference. At the second nozzle 56B out from the center of coordinates, the circumference is only $2\pi/300$ inches, or 0.0209 inch, and collecting 1,885 image pixels along this circular path is incorrect because it will produce too many pixels along that circular path. At the sensor element next to the outermost sensor element, i.e. $1/300$ inch closer to the center of rotation than sensor element 56N, the number of pixels sampled to maintain 300 pixels per inch should be $2\pi(1.0-1/300)(300)$, which is 1,879. Instead, however, 1,885 pixels would actually be sampled if the sampling rate were to be the same as the outermost sensor element, and the pixels thus produced would be closer together than those produced by the outermost sensor element. During the sweep of REGION 1, or at any other region of the medium, pixels which have been sampled should not be re-sampled, and logic in the controller can easily determine which pixel is to be sampled by each sensor element, and sensor elements closer to the center of rotation can be sampled less frequently.

As a further example, when the sensor array has reached a RHO value of 2.0, after the second complete rotation of the medium, the sensor element 56A (closest to the center of rotation) is at a RHO value of 1.0, and will need to be sampled at one-half the rate of the outermost sensor element to maintain the same pixel spacing. Again, logic in the controller will adjust the sampling rate to not sample a pixel which has already been sampled once. However, it is desired to minimize total scan time by making the sensor element 56N, i.e. the outermost sensor element, sample at the maximum (constant) rate possible. FIG. 7 shows the relationship between the constant (maximum) rate of this outermost sensor element, while all other sensor elements will actually be sampled when the pixel over which they are to sample is at least $1/300^{th}$ of an inch away from any adjacent pixel, and this will always be at a lower rate of sampling than the maximum possible. These differences in rate rapidly diminish with distance from the center of rotation.

It is understood that the above-described embodiments are merely illustrative of the possible specific embodiments which may represent principles of the present invention. For example, other arrangements can be employed to provide the desired relative motion between the sensor head and the medium to provide a spiral path. For example, the sensor head can located on an arm mechanism which moves in a spiral path, with the medium located on a stationary platen. Or conversely, the sensor head can be located in a stationary position, and the medium located on a platen which provides the desired spiral movement locus. Also, while the motion of the sensor head has been described as commencing from a position at the center of coordinates and moving radially outwardly, the sensor head could alternatively be started at any other position, e.g., at the outermost position and spiraled inwardly to end at the center of coordinates. Other arrangements may readily be devised in accordance with these principles by those skilled in the art without departing from the scope and spirit of the invention.

What is claimed is:

1. A method for optically scanning a flat image, comprising a sequence of the following steps;

providing an optical sensor array;

supporting a flat medium bearing the image to be optically scanned by the sensor array during a scanning cycle such that a portion of the image is positioned at a center of coordinates;

providing relative rotational and translational motion between the sensor array and the medium about a center of rotation at the center of coordinates such that a spiral locus centered at the center of coordinates is defined by the sensor array relative to the medium during an optical scanning cycle, and wherein the sensor array has optical coverage of the portion of the image at the center of coordinates during said scanning cycle; and collecting sensor data representing the image during the optical scanning cycle.

2. The method of claim 1, wherein said step of providing relative motion is accomplished without causing the sensor array to stop and reverse its direction periodically during the scanning cycle.

3. The method of claim 1 wherein said sensor array is mounted on an arm which radiates from the center of coordinates, and wherein said step of providing relative motion includes positioning the sensor array at the center of coordinates at the start of the scanning cycle and moving the sensor array outwardly on the arm from the center of coordinates while rotating the medium about the center of coordinates.

4. The method of claim 3 wherein the sensor array spans a first distance in a direction extending radially from the center of coordinates, and said step of providing relative motion includes moving the sensor array radially at a rate such that the sensor array is moved radially by a distance equal to the first distance for each complete rotation of the medium about the center of coordinates.

5. The method of claim 3 wherein the sensor array spans a first distance in a direction extending radially from the center of coordinates, and said step of providing relative motion includes moving the sensor array radially at a rate such that the sensor array is moved radially by a distance which is less than the first distance for each complete rotation of the medium about the center of coordinates.

6. The method of claim 3, wherein the step of providing relative motion includes rotating the medium about the center of coordinates with the sensor array is stationary for a first complete rotation of the medium, and wherein the sensor array is moved outwardly for subsequent rotation of the medium.

7. The method of claim 1 wherein said step of providing relative motion between the sensor array and the medium includes moving the sensor array radially at a rate selected to provide a partial overlap of the sensor array relative to the medium at the same angular position of the sensor array relative to the center of coordinates during the scanning cycle.

8. The method of claim 1 wherein said sensor array is a linear array of sensor elements and said step of providing relative motion between the sensor array and the medium includes moving the sensor array radially at a rate selected to provide a partial underlap of elements of the sensor array at different radial positions at the same angle of the sensor array relative to the center of coordinates.

9. The method of claim 1 wherein the step of providing relative movement includes moving the sensor array radially by a distance which is large enough to provide swept coverage of the sensor array over the entire area of the medium during said scanning cycle.

10. The method of claim 1 wherein the flat medium bearing the image is a rectangular medium having a diagonal dimension, and wherein a diameter of the spiral locus is equal to the diagonal dimension.

11. An optical scanning system, comprising:
   an optical sensor array comprising a plurality of sensor elements for collecting image data during an optical scanning cycle;
   a flat medium positioned relative to the sensor array to permit optical sensing of an image carried by the flat medium during an optical scanning cycle, and wherein a portion of the image is positioned at a center of coordinates;
   apparatus for providing relative rotational and translational motion between the sensor array and the medium with respect to a center of rotation at the center of coordinates such that a spiral locus centered at the center of coordinates is defined by the sensor array relative to the media during an optical scanning cycle, and wherein the sensor array has optical coverage of the portion of the image at the center of coordinates during the scanning cycle.

12. The scanning system of claim 11, wherein said apparatus for providing relative motion is adapted to provide said relative motion without causing the sensor array to stop and reverse its direction periodically during the scanning cycle.

13. The scanning system of claim 11 wherein said apparatus for providing relative motion between the sensor array and the medium is adapted to move the sensor array radially at a rate which provides a partial overlap of optical coverage of the sensor array relative to the medium during the scanning cycle at different radial positions of the sensor array.

14. The scanning system of claim 11 wherein said sensor array is a linear array of sensor elements, and said apparatus for providing relative motion between the sensor array and the medium is adapted to move the sensor array radially at a rate which provides a partial underlap of optical coverage of elements of the sensor array relative to the medium at different radial positions of the sensor array as the sensor array position relative to the image moves outwardly from the center of coordinates.

15. The scanning system of claim 11 further comprising:
   a carriage for holding the sensor array, said carriage mounted for movement along a carriage axis extending through an center of coordinates; and
   an arm structure for supporting the carriage for said movement along said carriage axis; and
   wherein said apparatus for providing relative motion includes a carriage drive apparatus for moving the optical sensor array outwardly on the arm from the center of coordinates and a turntable drive for rotating the medium about the center of coordinates.

16. The scanning system of claim 15 wherein the sensor array spans a first distance in a direction extending radially from the center of coordinates, and said carriage drive apparatus is adapted to move the sensor array radially at a rate such that the sensor array is moved radially by a distance equal to the first distance for each complete rotation of the medium about the center of coordinates.

17. The scanning system of claim 15 wherein the nozzle array spans a first distance in a direction extending radially from the center of coordinates, and said carriage drive apparatus is adapted to move the sensor array radially at a rate such that the sensor array is moved radially by a distance which is less than the first distance for each complete rotation of the medium about the center of coordinates.

18. The scanning system of claim 11 wherein the flat medium bearing the image is a rectangular medium having a diagonal dimension, and wherein a diameter of the spiral locus is equal to the diagonal dimension.

19. The scanning system of claim 11 wherein the apparatus for providing relative movement is adapted to move the sensor array radially by a distance which is large enough to provide swept coverage of the sensor array over the entire area of the medium.

20. A multi-function scanner/printer system, comprising:
   an optical sensor array comprising a plurality of sensor elements for collecting image data during an optical scanning cycle;
   a platen;
   a flat medium positioned on the platen during the optical scanning cycle relative to the sensor array to permit optical sensing of an image carried by the flat medium during the optical scanning cycle, and wherein at least a portion of the image to be scanned is positioned at a center of coordinates;
   apparatus for providing relative motion between the sensor array and the medium with respect to a center of rotation coincident with the center of coordinates such that a spiral locus centered at the center of coordinates is defined by the sensor array relative to the media during the optical scanning cycle;
   a memory for storing image data collected by the optical sensor array during said optical scanning cycle;
   an ink jet pen having a nozzle array;
   apparatus for providing relative motion with respect to said center of rotation between the nozzle array and a print medium positioned on the platen during an ink jet printing cycle such that a spiral locus centered at the center of coordinates is defined by the nozzle array relative to a flat print medium during the ink jet printing cycle.

21. The system of claim 20 further comprising a controller adapted to control said ink jet pen during the printing cycle using image data collected during said scanning cycle to produce a copy of said scanned image.

22. The system of claim 20, wherein said apparatus for providing relative motion to said sensor array is adapted to provide said relative motion without causing the sensor array to stop and reverse its direction periodically during the scanning cycle.

23. The system of claim 20 further comprising:
a carriage for holding the sensor array and said ink jet pen, said carriage mounted for movement along a carriage axis extending through the center of coordinates; and
an arm structure for supporting the carriage for said movement along said carriage axis; and
wherein said apparatus for providing relative motion includes a carriage drive apparatus for moving the optical sensor array outwardly on the arm from the center of coordinates and a turntable drive for rotating the medium about the center of coordinates.

24. The system of claim 23 wherein the sensor array spans a first distance in a direction extending radially from the center of coordinates, and said carriage drive apparatus is adapted to move the sensor array radially at a rate such that the sensor array is moved radially by a distance equal to the first distance for each complete rotation of the medium about the center of coordinates.

25. The sensor system of claim 23 wherein said sensor array is adapted to sample image pixels at a constant rate for the scanning cycle, and the apparatus for rotating the medium is adapted to vary the rotation rate of the medium to achieve a substantially constant tangential velocity of the sensor array.

26. A method for optically scanning a flat image, comprising a sequence of the following steps;
providing an optical sensor array mounted on an arm which radiates from a center of coordinates, said sensor array including a plurality of sensor elements including an outermost sensor element relative to the center of coordinates;
supporting a flat medium to be optically scanned by the sensor array during a scanning cycle;
providing relative motion between the sensor array and the medium such that a spiral locus is defined by the sensor array relative to the media during an optical scanning cycle, including moving the sensor array outwardly on the arm from the center of coordinates while rotating the medium about the center of coordinates at a rotation rate which varies to achieve a substantially constant tangential velocity of the outermost element of the sensor array; and
collecting sensor data representing the image during the optical scanning cycle, including sampling the sensor elements at a constant rate.

27. A method for optically scanning a flat image, comprising a sequence of the following steps;
providing an optical sensor array mounted on an arm which radiates from a center of coordinates, said sensor array including a plurality of sensor elements;
supporting a flat medium to be optically scanned by the sensor array during a scanning cycle;
providing relative motion between the sensor array and the medium such that a spiral locus is defined by the sensor array relative to the media during an optical scanning cycle, including moving the sensor array outwardly on the arm from the center of coordinates while rotating the medium about the center of coordinates at a rotation rate which varies to achieve a substantially constant tangential velocity of a given sensor element comprising the sensor array; and
collecting sensor data representing the image during the optical scanning cycle, including sampling the sensor elements at a varying sampling rate.

28. An optical scanning system, comprising:
an optical sensor array comprising a plurality of sensor elements for collecting image data during an optical scanning cycle;
a flat medium positioned relative to the sensor array to permit optical sensing of an image carried by the flat medium during an optical scanning cycle;
apparatus for providing relative rotational and translational motion between the sensor array and the medium relative to a center of rotation such that a spiral locus centered at the center of rotation is defined by the sensor array relative to the media during an optical scanning cycle; and
a controller for generating sampling commands to cause said sensor array to sample image pixels at a varying rate for the scanning cycle.

29. A multi-function scanner/printer system, comprising:
an optical sensor array comprising a plurality of sensor elements for collecting image data during an optical scanning cycle;
a rotatable platen surface for rotation about a center of rotation;
a flat medium disposed on the platen and positioned relative to the sensor array to permit optical sensing of an image carried by the flat medium during said optical scanning cycle;
apparatus for providing relative rotational and translational motion between the sensor array and the medium relative to said center of rotation such that a spiral locus is defined by the sensor array relative to the media during an optical scanning cycle;
a memory for storing a set of image data collected by the optical sensor array during said optical scanning cycle said stored image data representing said image;
an ink jet pen having a nozzle array;
apparatus for providing relative motion between the nozzle array and a flat print medium disposed on the platen such that a spiral locus is defined by the nozzle array relative to the flat print medium during an ink jet printing cycle; and
a controller adapted to control the ink jet pen and the apparatus for providing relative motion between the nozzle array and the print medium to provide a print mode employing said set of image data wherein ink droplets are ejected by the pen at predetermined pixel positions on the print medium, said controller further adapted to control the sensor array and the apparatus for providing relative motion between the sensor array and the medium carrying the image to provide a scan mode wherein the set of image data collected during an optical scanning cycle correspond in position to said predetermined pixel positions employed during said print mode.

* * * * *